Patented Sept. 7, 1937

2,092,295

UNITED STATES PATENT OFFICE 2,092,295

PRODUCTION OF SYNTHETIC RESINS AND RESINOUS MATERIALS

Adrianus Johannes van Peski and Johan Ferdinand Maurits Caudri, Amsterdam, Netherlands, assignors to Shell Development Company, San Francisco, Calif., a corporation of Delaware No Drawing. Application December 18, 1935, Serial No. 55,004. In the Netherlands January 30, 1935

20 Claims. (Cl. 260—2)

This invention relates to a process for the manufacture of useful synthetic resins and resinous materials.

One of the principal objects of this invention is to provide a process for the production of synthetic resins and resin-like materials of controlled and improved character from petroleum hydrocarbons or hydrocarbon material derived from petroleum or petroleum products. The invention may be executed to obtain in practical yields synthetic resins and resinous materials which are substantially soluble in most organic solvents and in drying and semi-drying oils, which produce a clear, durable coating film when made into varnish, lacquers and the like coating materials, and which do not retard the drying of fatty oils as linseed oil and the like. In accordance with the principles of the invention, such useful resins and resinous materials are produced in good yields, while the formation of useless resins and polymers which are insoluble in organic solvents and fatty oils is substantially completely avoided.

In the execution of the invention, a mixture comprising one or more conjugated double bond diolefines, one or more olefines and/or one or more aromatic hydrocarbons is treated with a catalyst or activating agent which comprises a halide selected from the group consisting of the halides of polyvalent metals which will hydrolyze in water to give an acid reaction, and the boron halides, in combination with an inorganic or organic compound possessing a dipole moment and being capable of forming a complex with the metal halide or boron halide, whereby the desired interaction, resulting in the formation of resins soluble in most organic solvents, occurs at a practical rate while undesirable side reactions, such as polymerization of the conjugated double bond diolefines, which yield insoluble products useless for the purposes desired, are substantially completely obviated.

It is known that mixtures comprising olefines and conjugated double bond diolefines can be treated in the presence of the usual condensation catalysts, as aluminum chloride, and resinous materials obtained. These methods are, however, unsatisfactory for several reasons. The reaction is difficult to control to the extent that resins of predetermined characteristics are obtained. Further, the tendency of the very reactive conjugated double bond diolefines to polymerize cannot be controlled or obviated and as a consequence large quantities of useless polymerization products are obtained. These polymerization products are insoluble in organic solvents and drying oils and hence their formation represents only a waste of reactants. The work of prior investigators would seem to indicate that the hardness of the useful resins obtained with the conventional catalysts would be increased as the proportion of conjugated double bond diolefines to olefines was increased in the mixture treated. However, this was found to be by no means the case. Increasing the concentration of the conjugated double bond diolefines in the reaction mixture failed to result in a soluble resin of sufficient hardness and, in addition, greater quantities of the useless insoluble polymerization products are obtained.

Now, in accordance with the process of the present invention, we may materially decrease and, in the great majority of cases, substantially completely avoid the formation of useless diolefine polymerization and condensation products and at the same time obtain excellent yields of useful resins and resinous materials of the desired degree of hardness by effecting the treatment in the presence of complex catalysts which comprises an acid-acting metal halide or a boron halide in combination with another inorganic halide having a dipole moment, or in combination with an organic compound possessing a dipole moment and being capable of forming a complex with the metallic halide.

The complex cataylsts herein described act differently than do the acid-acting metal halides and boron halides per se in that the complex catalysts accelerate the reactions to form resins of sufficient hardness which are soluble in organic solvents, while at the same time undesirable polymerization and condensation reactions, which would occur to prohibitive extents in the presence of the metal and boron halides alone, are substantially obviated.

A suitable group of catalysts embraces the halides of the elements as aluminum, boron, iron, tin, antimony, arsenic, bismuth, molybdenum, tungsten, vanadium, zinc, titanium, thorium, cerium, zirconium, indium, thallium and the like in combination with inorganic or organic compounds possessing a dipole moment, such as the neutral-acting inorganic metal halides, for example, the alkali metal and alkaline earth metal halides, the silver, nickel and cobalt halides and the like; or the organic oxy-compounds possessing a dipole moment, as the organic nitro-compounds such as the nitro-paraffins, the nitro-aralkyl compounds and the nitro-alicyclic compounds as nitro-cyclohexane, nitro-benzene and the like and their homologues, analogues and substitution products; the ketones of aliphatic, aralkyl, aromatic or mixed character as acetone, methyl ethyl ketone, methyl propyl ketone, diethyl ketone, acetophenone, ethyl phenyl ketone, benzophenone, phenyl totyl ketone and the like and their homologues and suitable substitution products; the aliphatic, aralkyl or aromatic acid halides, particularly the aromatic acid halides as benzoyl chloride, benzoyl bromide and the like and their homologues and suitable substitution products; the organic sulfones, particularly the aryl and aralkyl sulfones as diphenyl sulfone, benzyl sulfone and the like and their homologues and analogues; and other organic compounds which possess a dipole moment and are capable of combining with an acid-acting metallic halide.

The complex catalysts may for the sake of convenience be represented by the general formula X—Y, wherein X represents an acid-acting metallic halide and Y represents an inorganic dipole moment compound as a neutral-acting metal halide, or an organic oxy-compound possessing a dipole moment as a ketone, sulfone, acid halide or organic nitro-compound.

The readily available and cheap aluminum, boron, iron, zinc and tin halides are particularly suitable acid-acting halides which may be combined with a dipole moment compound to form a suitable complex catalyst. The term "acid-acting" is used herein and in the appended claims to designate those metallic halides which hydrolyze in the presence of water to give an acid reaction. The term "metallic halide" is intended to embrace the boron halides as well as the metal halides, since for the purposes of the invention the boron halides act as metal halides.

As examples of suitable complex catalysts, the following are listed: $AlCl_3$—NaCl, $AlCl_3$—$BaCl_2$, $AlBr_3$—KCl, $AlCl_3$—AgCl, $AlF_3$—NaCl, $AlBr_3$—AgBr, $AlBr_3$—$BaBr_2$, $ZnCl_2$—NaCl, $ZnCl_2$—$CaCl_2$, $ZnBr_2$—AgBr, $FeCl_3$—AgCl, $FeCl_3$—NaCl, $SnCl_4$—NaCl, $SnCl_4$—$CaCl_2$, $BF_3$—NaCl, $BCl_3$—NaCl, $BF_3$—AgF, $BF_3$—$BaCl_2$, $AlCl_3$—$NH_4Cl$, $AlCl_3$—nitromethane, $AlCl_3$—nitrobenzene, $AlCl_3$—nitrobenzene—NaCl, $AlCl_3$—acetone, $AlCl_3$—acetophenone, $AlCl_3$—benzophenone, $AlCl_3$—benzoyl chloride, $AlCl_3$—diphenyl sulfone, $AlCl_3$—dibenzyl sulfone, $FeCl_3$—nitrobenzene, $FeCl_3$—nitrobenzene—KCl, $ZnCl_2$—acetophenone, $SnCl_4$—benzoyl chloride, $BF_3$—nitromethane and the like.

The compound catalysts may be prepared in any suitable manner and used per se or a mixture comprising more than one complex catalyst may be used. A complex metal halide catalyst of the type of the catalyst $AlCl_3$—NaCl, for example, may be prepared by combining the two metal halides in the required amount, preferably in aqueous solution followed by evaporation to dryness. If desired, said metal halides may be combined in the presence of an organic solvent for them, and the solvent removed by distillation, evaporation or other suitable means, or the complex catalyst may in some cases be applied in solution or suspension in the organic solvent.

The complex catalysts of the type of $AlCl_3$—nitrobenzene, for example, may be prepared by combining a suitable acid-reacting metal halide of the type herein specified with an organic compound having a dipole moment and being capable of forming a complex with the metal halide. For example, the metal halide in the required amount may be dissolved in the organic compound possessing a dipole moment. The complex compound formed may be soluble or insoluble in the liquid organic compound. In the first case, the solution may be used or the complex compound may be more or less isolated therefrom, for example, by extracting wholly or in part the excess of the organic liquid with a suitable extracting agent. The complex compound from which the excess of the organic liquid has been extracted may be used as such or dissolved or dispersed in another suitable liquid.

Thus, for example, the solution of the complex $AlCl_3$—nitrobenzene in nitrobenzene may be extracted with a suitable extractant as gasoline to remove substantially all or a part of the excess of nitrobenzene whereby a liquid catalyst is obtained which is very suitable for executing the process of the invention.

A solid substance may be obtained when the polyhalides are combined with some organic compounds possessing dipole moments. Such solid complex catalysts may be separated from the organic liquid medium in which they were prepared and used per se or dissolved or suspended in a suitable liquid. The complex $AlCl_3$—diphenyl sulfone is an example of such a solid complex catalyst.

The compounds butadiene, 2-methyl butadiene-1,3, 2,3-dimethyl butadiene-1,3, 2-ethyl butadiene-1,3, pentadiene, 3-methyl pentadiene-2,4, 3,4-dimethyl pentadinene-2,4, the straight and branched chain as well as cyclic hexadienes, heptadienes, and their homologues and suitable substitutions are examples of conjugated double bond diolefines, at least one species of which is present in substantial amount in the mixture treated. The term "conjugate double bond diolefine" used herein and in the appended claims embraces the open chain as well as cyclic diolefines of the type embracing the characteristic group $C=C-C=C$.

As examples of olefines which may be present in the mixture which contains one or more conjugated double bond diolefines and which may or may not also contain one or more aromatic compounds, the following are suitable: ethylene, propylene, the secondary and tertiary base butylenes as α-butylene, β-butylene, γ-butylene, the secondary and tertiary base amylenes, hexylenes, heptylenes, octylenes, nonylenes and the like and their higher homologues and suitable substitution products. The term "olefine" as used herein and in the appended claims is intended to embrace those hydrocarbons possessing an olefinic linkage between two aliphatic carbon atoms. Thus it is seen that the olefine co-polymers as dipropylene, di-beta butylene, diisobutylene, triisobutylene, the diamylenes, the dihexylenes and the like as well as the olefine inter-polymerization products obtainable by polymerization of an olefine with a dissimilar olefine are within the scope of the invention. In addition to the conjugate double bond diolefines, the mixture treated may contain one or more polyolefines as diallyl, diisobutenyl, diisoamyl and the like wherein the olefinic double bonds are not conjugated.

A mixture containing one or a plurality of conjugate double bond diolefines and one or a plurality of olefines may be treated, or the mixture may contain, in addition to one or more diolefines, one or more olefines as well as one or more aromatic compounds or the treated mixture may be substantially devoid of olefines and comprise one or more conjugate double bond diolefines and one or more aromatic compounds.

As aromatic compounds which can be condensed in combination with diolefines, whether or not in the presence of olefines, the following are representative: benzene, toluene, xylene, phenanthrene, naphthalene, acenaphthalene, anthracene, fluorene and the like and such aromatic compounds which have been partially saturated by the addition of hydrogen thereto as dihydrobenzene, tetrahydrobenzene, tetrahydronaphthalene and the like as well as the homologues and suitable substitution products of such aromatic compounds. Edeleanu and the like extracts from petroleum refining processes are convenient sources of suitable aromatic compounds.

In executing the invention, unsaturated hydrocarbons from any convenient source may be used. Relatively pure hydrocarbon compounds, such as cyclic, straight or branched chain conjugated double bond diolefines, cyclic, straight or branched chain mono-olefines, terpenes, aromatic compounds, substituted aromatics, or mixtures of these may be reacted together in controlled proportions to produce useful resins and resinous materials of predetermined characteristics.

Indeterminate mixtures containing conjugated double bond diolefines, olefines and/or aromatics, or particular fractions of such mixtures may be advantageously treated in accordance with the process. Such hydrocarbon mixtures are obtainable by the pyrogenesis or cracking of petroleum oils, shale oils, petroleum products, etc. and by the destructive distillation of coal, peat, pitches, waxes, asphalts, animal oils, vegetable oils and the like carbonaceous material. Cracked petroleum distillates or special fractions of cracked petroleum distillates are particularly suitable for our purpose.

Certain fractions or cuts of petroleum and other hydrocarbon distillates may be used per se or mixed in varying proportions depending upon their composition and the desired composition of the mixture to be treated, or varying proportions of relatively pure unsaturated hydrocarbons of any or all of the classes mentioned above, may be mixed with certain hydrocarbon fractions, as cracked distillate fractions, to provide satisfactory starting materials for resin production.

The hydrocarbon mixtures, as cracked distillates are conveniently fractionated into cuts or fractions containing hydrocarbons which contain, for the most part, the same number of carbon atoms to the molecule. Very satisfactory resins have been produced from a fraction of cracked distillate boiling between about 25° C. and 180° C. This fraction usually comprises in varying proportions, olefines as the amylenes and their homologues and conjugate double bond diolefines as isoprene and its homologues; cyclic olefines and cyclic diolefines such as cyclohexene, cyclohexadiene, methyl cyclohexadiene and their homologues; and benzene and substituted aromatic hydrocarbons as toluene and xylene. Certain fractions or cuts obtainable from such a fraction of cracked distillate have also been found to produce desirable resins when treated in accordance with the invention. Thus a fraction of cracked distillate boiling between about 25° C. and about 50° C., and a fraction boiling between about 125° C. and about 180° C., may be used together in varying proportions to yield useful resins and resin-like materials.

The fraction boiling between about 25° C. to about 50° C. comprises among the resin-forming materials present, a mixture of $C_5H_8$ and $C_5H_{10}$, that is, five carbon atom olefines and conjugated double bond diolefines. A varying proportion of cyclic diolefines of the formula $C_5H_6$ is also usually present. In general such a fraction is rich in conjugated double bond diolefines.

The fraction boiling in the range of from about 125° C. to about 180° C. usually contains a large proportion of hydrocarbons of the $C_{10}H_{12}$ series, that is polymers of the cyclic diolefines, plus some polymers of the lower straight chain and cyclic olefines. Some substituted benzene hydrocarbons, together with some toluene, xylene and cymene, are usually present.

As an example of a suitable method of executing the reaction, the following procedure may be followed. A mixture comprising one or more conjugated double bond diolefines, one or more olefines and/or one or more aromatic compounds may be charged to any desired reaction vessel. A preferably employed reactor comprises a kettle of the desired size equipped with mechanical stirring means and means for heating and cooling its contents. The reaction is preferably effected with the reactants in the liquid phase but vapor or liquid-vapor phase methods of operation may be used when desired. The reactants in the desired proportions may be mixed before, during or after their introduction into the reaction vessel. The proportions of the conjugated double bond diolefines to olefines and/or aromatics in the reaction mixture may vary considerably depending upon the characteristics of the resin desired. Preferably we employ a considerable excess of the conjugated double bond diolefines to the other reactants. The reaction may or may not be effected in the presence of a solvent or diluent. When hydrocarbon fractions as pressure distillates and the like are used, the inert hydrocarbons may act as solvents or diluents. A substantially inert solvent as a saturated hydrocarbon mixture as benzol, a saturated gasoline, mixtures of hexanes, etc., may be added to the reaction mixture to give a freely flowable mixture during reaction, to assist in mixing, to afford better contact of the complex catalyst and the reactants or for other reasons, and any desired proportion of the solvent or diluent may be used. The solvent or diluent used should be preferably chemically inert to the complex catalyst.

The complex catalyst may be added to the reaction mixture in any convenient manner as a solid, as a liquid or suspended or dissolved in a suitable medium or solvent therefor. The catalyst may be added all at once but it is preferably added to the agitated reaction mixture slowly in a continuous or intermittent manner until the required amount has been added. By a suitable regulation of the rate of admittance of the catalyst, the temperature of the reaction mixture may be more effectively maintained within the desired temperature range. With the addition of the catalyst, there may be a rather vigorous chemical reaction and a resultant rise in temperature of the reaction mixture. It is desirable to control the temperature within certain limits as herein described, such control may be conveniently effected by cooling the reaction mixture and/or by adding the catalyst slowly.

The amount of the catalyst used may materially affect the characteristics of the resin produced, such as iodine value, color and hardness. The relative amount of the complex catalyst used may also affect the yield of the resinous material. Accordingly, the proportion of catalyst used in each particular case may vary depending upon the particular resin desired and upon the yield required in plant operation. The type of hydrocarbon-soluble resin produced is also affected by the character and proportions of the starting materials used. A predetermined type of resin having the desired characteristics may be controlled by varying the amount of the complex catalyst and by the choice of starting materials of controlled proportions and character. In producing a desired resin, suitable proportions of a particular fraction or mixture of hydrocarbon fractions containing conjugate double bond diolefines, olefines and/or aromatic hydrocarbons may then be used alone or mixed with the desired proportion of relatively pure hydrocarbon compounds.

The reaction is preferably effected at about atmospheric pressure at a temperature of from about 20° C. to about 50° C., although higher temperatures and pressures may be used when necessary or desirable. The reaction is preferably effected with the reactants in the liquid phase. When the reaction is effected under atmospheric pressure, it is in some cases desirable that the temperature should not be permitted to rise much above about 40° C. Otherwise, the polymerization vessel should be kept under a pressure greater than atmospheric to prevent undue volatilization and loss of resin-forming hydrocarbons. Reaction at relatively high temperatures, for example, at temperatures greater than about 65° C. may require the use of a reaction vessel capable of withstanding considerable pressure.

The reaction is preferably effected in the substantial absence of water. When the reactants or fractions or mixtures containing them contain prohibitive amounts of water, they are preferably dried by the conventional dehydrating methods, as for example, by treatment with dehydrated calcium chloride, prior to, during or after their introduction to the reaction vessel, but preferably before the catalyst is contacted therewith.

When the reaction whereby the useful hydrocarbon-soluble resin is formed has proceeded to substantial completion or to the desired extent, the mixture may be treated to remove reactants, solvents, etc. and obtain the resinous material in the desired concentration in the solvent or mixture of reactants. If desired, the reaction mixture may be neutralized to terminate the action of the catalyst or any acid-acting substances which may have been formed during the reaction. Various water soluble alkalies, as the alkali- and alkaline earth metal oxides, hydroxides, carbonates, bicarbonates, etc. may be used to effect neutralization. Aqueous ammonia solutions are very conveniently employed, as an excess of ammonia may be readily removed from the mixture by distillation, and it appears to have no deleterious effect upon the resulting resinous material.

The solvent may be partially or substantially completely removed from the resinous material, as desired, by any suitable means, as by steam distillation, distillation under reduced pressure and the like. The solvent or solvents, unreacted hydrocarbons, etc., removed from the resinous material may be recovered by means of a conventional condensing system and reutilized in the first stage of the process if desired. If desired, the concentration of the resin may be controlled so as to leave any desired amount of solvent in the resin so that it may be maintained in solution form. Such a resin solution may be withdrawn to storage or used directly as desired. If a solid or hard resinous material is desired, the distillation may be continued until substantially all of the readily volatile materials have been driven off. If a still harder type of resinous material is desired, the residue from the distillation may be treated with steam or superheated steam.

The following specific examples illustrate modes of executing the invention to produce useful synthetic resinous materials which are substantially completely soluble in most organic solvents and in drying and semi-drying oils. It is to be understood that the invention is not to be regarded as limited to the specific reactants, catalysts or modes of operation disclosed in said examples.

*Example I*

About 4.85 kilograms of butadiene were introduced into a suitable reaction vessel equipped with heating and cooling means and mechanical means for agitating its contents, and about 2.97 kilograms of a hexene hydrocarbon fraction, obtained by fractional distillation of a product obtained by the vapor phase cracking of a paraffin wax, were added thereto. The hexene fraction consisted, for the most part of six carbon atom hydrocarbons, that is, hexenes, hexanes and benzene. While the mixture was stirred in the reaction vessel, about 1.165 kilograms of the complex catalyst $AlCl_3$—$CH_3NO_2$ suspended in about 1.89 kilograms of nitromethane were added thereto. The mixture was stirred at about atmospheric pressure and at a temperature of from about 30° C. to 35° C. for a period of about 5 hours.

At the end of this time, the reaction mixture was distilled under a pressure of about 20 mm. of mercury until the kettle temperature reached about 250° C. The residue contained about 6.66 kilograms of a resinous material soluble in most organic solvents. Substantially no insoluble resins or butadiene polymerization products were formed.

When the above experiment was repeated using the same amounts of reactants and the same operating conditions using $AlCl_3$ suspended in carbon tetrachloride, which does not form a complex with the $AlCl_3$, the resulting product contained only about 4.40 kilograms of soluble resinous material and, in addition, about 3.02 kilograms of insoluble resinous materials which were found to be, for the most part, butadiene polymerization products.

*Example II*

About 4.41 kilograms of butadiene and about 2.67 kilograms of a hydrocarbon fraction boiling between 35 and 70° C., obtained by fractional distillation of a cracked gasoline obtained by the vapor phase cracking of a paraffin wax, were introduced into a suitable reaction vessel equipped with heating and cooling means and a mechanical agitator. Whilst stirring the mixture 1.33 kilograms of a complex $AlCl_3$—$NaCl$ catalyst (containing 0.8 kilogram $AlCl_3$ and 0.53 kilogram $NaCl$) suspended in 2.5 liters of carbon tetrachloride were added thereto. The mixture was stirred at a temperature of 30–35° C. during about 1 hour.

At the end of this period the reaction mixture was distilled under a pressure of 20 mm. of mercury until the kettle temperature reached about 250° C. The residue contained 5.66 kilograms of resinous material soluble in most organic solvents and only about 0.4 kilogram of insoluble product.

When repeating the experiment with the same amounts of reactants and under the same operating conditions but with $AlCl_3$ instead of the complex $AlCl_3$—$NaCl$ catalyst, the residue contained 4.10 kilograms of soluble resinous material and 2.09 kilograms of insoluble product.

Excellent yields of soluble resinous materials, with the substantial obviation of the formation of useless insoluble resins and diolefine polymerization products, can also be obtained by employing, instead of the AlCl₃—CH₃NO₂ or the AlCl₃—NaCl catalysts, other complex catalysts consisting of acid-acting metallic halides in combination with inorganic or organic compounds possessing a dipole moment, or mixtures of such complex catalysts may be employed.

The synthetic resins and resinous materials obtained in accordance with the invention are in most cases substantially insoluble in water and they may possess only a limited solubility in the lower alcohols and acetone; however, they are substantially soluble in most hydrocarbons, halogenated hydrocarbons and hydrocarbon mixtures as gasoline, petroleum ether and the like. Further they are soluble in most drying and semi-drying oils and they produce a clear durable coating film when made into varnish, lacquers and other coating materials. In many cases, the resinous materials are readily soluble in fatty oils, such as linseed oil, and they do not retard the drying of such oils; accordingly they are useful raw materials in the manufacture of lacquers. The solubility of the resins in fatty oils may, if necessary or desirable, be increased by treating the resinous material during or after its formation with oxygen, oxygen-containing gases or substances capable of yielding oxygen under the conditions of the treatment, contingently in the presence of suitable catalysts at elevated temperatures.

While we have described our invention in a detailed manner and illustrated suitable means of executing the same, it is to be understood that modifications may be made and that no limitations other than those imposed by the scope of the appended claims are intended.

We claim as our invention:

1. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

2. A process for the production of a useful synthetic resinous material from unsaturated hydrocarbons which comprises reacting a conjugate double bond diolefine with an olefine in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

3. A process for the production of a useful synthetic resinous material from unsaturated hydrocarbons which comprises reacting a conjugate double bond diolefine with materially less than an equal weight of an aromatic hydrocarbon in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

4. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon, and wherein the diolefine is in substantial molecular excess over the other unsaturated reactants, in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

5. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of an acid-acting metallic halide in combination with a neutral-acting metal halide, whereby a resinous hydrocarbon material substantially soluble in most organic solvents is obtained while the formation of diolefine polymerization products relatively insoluble in organic solvents is substantially obviated.

6. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of an acid-acting metallic halide in combination with an organic oxy-compound possessing a dipole moment, whereby a resinous hydrocarbon material substantially soluble in most organic solvents is obtained while the formation of diolefine polymerization products relatively insoluble in organic solvents is substantially obviated.

7. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of an acid-acting metal halide in combination with an organic oxy-compound of the class consisting of ketones, sulfones, carboxylic acid halides and organic nitro-compounds, whereby a resinous hydrocarbon material substantially soluble in most organic solvents is obtained while the formation of diolefine polymerization products relatively insoluble in organic solvents is substantially obviated.

8. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of a metal halide of the class consisting of the aluminum, boron, iron, zinc and tin halides in combination with a compound possessing a dipole moment, whereby a resinous hydrocarbon material substantially soluble in most organic solvents is obtained while the formation of diolefine polymerization products relatively insoluble in organic solvents is substantially obviated.

9. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst consisting of a metal halide of the class consisting of the aluminum, boron, iron, zinc and tin halides in combination with a neutral-acting metal halide, whereby a resinous hydrocarbon material substantially soluble in most organic solvents is obtained while the formation of diolefine polymerization products relatively insoluble in organic solvents is substantially obviated.

10. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon, and wherein the diolefine is in substantial molecular excess over the other unsaturated reactants, in the presence of a complex catalyst consisting of a metal halide of the class consisting of the aluminum, boron, iron, zinc and tin halides in combination with an organic oxy-compound of the class consisting of the ketones, sulfones, carboxylic acid halides and organic nitro-compounds, whereby a resinous hydrocarbon material substantially soluble in most organic solvents is obtained while the formation of diolefine polymerization products relatively insoluble in organic solvents is substantially obviated.

11. A process for the production of a useful synthetic resinous material from unsaturated hydrocarbons which comprises reacting a conjugate double bond diolefine with a mixture of mono-olefines in the presence of a complex catalyst consisting of a metal halide of the class consisting of the aluminum, boron, iron, zinc and tin halides in combination with an organic oxy-compound of the class consisting of the ketones, sulfones, carboxylic acid halides and organic nitro-compounds, whereby a resinous hydrocarbon material substantially soluble in most organic solvents is obtained while the formation of diolefine polymerization products relatively insoluble in organic solvents is substantially obviated.

12. A process for the production of a useful synthetic resinous material from unsaturated hydrocarbons which comprises reacting a mixture of hydrocarbons containing as essential ingredients a conjugated double bond diolefine, a mono-olefine and an aromatic hydrocarbon in the presence of a complex catalyst comprising an aluminum halide in combination with nitrobenzene, whereby a resinous hydrocarbon material substantially soluble in most organic solvents is obtained while the formation of diolefine polymerization products relatively insoluble in organic solvents is substantially obviated.

13. A process for the production of a useful synthetic resinous material from unsaturated hydrocarbons which comprises reacting a conjugate double bond diolefine with a hydrocarbon fraction containing olefines and aromatic hydrocarbons in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

14. A process for the production of a useful synthetic resinous material from unsaturated hydrocarbons which comprises treating a mixture of hydrocarbons comprising as essential ingredients at least one conjugated double bond diolefine and at least one mono-olefine, with the former in substantial molecular excess over the latter, in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

15. A process for the production of a useful synthetic resinous material from unsaturated hydrocarbons which comprises treating a mixture of hydrocarbons comprising conjugate double bond diolefines, olefines and aromatic hydrocarbons, with the conjugate double bond diolefines in substantial molecular excess over the olefines and aromatic hydrocarbons, in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

16. A process for the production of a useful synthetic resinous material from unsaturated hydrocarbons which comprises reacting butadiene with a hydrocarbon fraction containing olefines and aromatic hydrocarbons in the presence of a complex catalyst consisting of an acid-acting metallic halide in combination with a compound possessing a dipole moment, whereby a resinous hydrocarbon material substantially soluble in most organic solvents is obtained while the formation of diolefine polymerization products relatively insoluble in organic solvents is substantially obviated.

17. A process for the production of a useful synthetic resinous material from unsaturated hydrocarbons which comprises reacting butadiene with a hydrocarbon fraction containing olefines and aromatic hydrocarbons in the presence of a complex catalyst consisting of a metal halide of the class consisting of the aluminum, boron, iron, zinc and tin halides in combination with a neutral-acting metal halide, whereby a resinous hydrocarbon material substantially soluble in most organic solvents is obtained while the formation of diolefine polymerization products relatively insoluble in organic solvents is substantially obviated.

18. A process for the production of a useful synthetic resinous material from unsaturated hydrocarbons which comprises reacting butadiene with a hydrocarbon fraction containing olefines and aromatic hydrocarbons in the presence of a complex catalyst consisting of a metal halide of the class consisting of the aluminum, boron, iron, zinc and tin halides in combination with an organic oxy-compound of the class consisting of the ketones, sulfones, carboxylic acid halides and organic nitro-compounds, whereby a resinous hydrocarbon material substantially soluble in most organic solvents is obtained while the formation of diolefine polymerization products relatively insoluble in organic solvents is substantially obviated.

19. A process for the production of a useful synthetic resinous material from unsaturated hydrocarbons which comprises reacting a hydrocarbon fraction containing butadiene with a hexene hydrocarbon fraction in the presence of a complex catalyst consisting of an aluminum halide in combination with an organic oxy-compound of the class consisting of the ketones, sulfones, carboxylic acid halides and organic nitro-compounds, whereby a resinous hydrocarbon material substantially soluble in most organic solvents is obtained while the formation of diolefine polymerization products relatively insoluble in organic solvents is substantially obviated.

20. A process for the production of a useful synthetic resinous material which comprises reacting butadiene with a hexene hydrocarbon fraction, with the butadiene in substantial molecular excess of the unsaturated hydrocarbons present in said hexene fraction, in the presence of a complex catalyst consisting of aluminum chloride in combination with nitro-methane, whereby a resinous hydrocarbon material substantially soluble in most organic solvents is obtained while the formation of diolefine polymerization products relatively insoluble in organic solvents is substantially obviated.

ADRIANUS JOHANNES VAN PESKI.
JOHAN FERDINAND MAURITS CAUDRI.